United States Patent
Sans

(10) Patent No.: US 9,731,715 B2
(45) Date of Patent: Aug. 15, 2017

(54) SEMI-AUTOMATIC METHOD FOR ASSISTING WITH PARKING A MOTOR VEHICLE AND ASSOCIATED DEVICE

(71) Applicants: CONTINENTAL AUTOMOTIVE FRANCE, Toulouse (FR); CONTINENTAL AUTOMOTIVE GMBH, Hannover (DE)

(72) Inventor: Mariano Sans, Blagnac (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 4 days.

(21) Appl. No.: 14/765,077

(22) PCT Filed: Feb. 25, 2014

(86) PCT No.: PCT/EP2014/000487
§ 371 (c)(1),
(2) Date: Jul. 31, 2015

(87) PCT Pub. No.: WO2014/131507
PCT Pub. Date: Sep. 4, 2014

(65) Prior Publication Data
US 2015/0367846 A1    Dec. 24, 2015

(30) Foreign Application Priority Data
Feb. 27, 2013    (FR) ...................................... 13 51747

(51) Int. Cl.
*B60W 30/06* (2006.01)
*B62D 15/02* (2006.01)

(52) U.S. Cl.
CPC ........... *B60W 30/06* (2013.01); *B62D 15/027* (2013.01); *B62D 15/0275* (2013.01); *B62D 15/0285* (2013.01)

(58) Field of Classification Search
CPC . B60W 30/06; B62D 15/027; B62D 15/0285; B62D 15/0275
See application file for complete search history.

(56) References Cited

U.S. PATENT DOCUMENTS

| | | | |
|---|---|---|---|
| 3,022,850 A | 2/1962 | Bidwell et al. | |
| 5,923,096 A * | 7/1999 | Manak | B60L 11/1805 180/65.1 |

(Continued)

FOREIGN PATENT DOCUMENTS

| | | |
|---|---|---|
| DE | 102006035021 | 1/2008 |
| DE | 102008018186 | 10/2009 |
| WO | 2010043944 | 4/2010 |

OTHER PUBLICATIONS

International Search Report, dated May 15, 2014, from corresponding PCT application.

*Primary Examiner* — Mussa A Shaawat
*Assistant Examiner* — Michael Kerrigan
(74) *Attorney, Agent, or Firm* — Young & Thompson

(57) ABSTRACT

A method for assisting with the parking of a motor vehicle includes detecting the position of a movement-control member able to indicate a transverse component and a longitudinal component, with respect to the motor vehicle, of a movement instruction, and analyzing the movement instruction. The method also includes classifying the movement instruction in two modes (mode 1, mode 2) according to the angle β about the transverse axis of the movement-control member with respect to its rest position and the comparison thereof with the angel βM that brings the steered wheels of the motor vehicle to the angle αM of maximum steering (Continued)

Figure 1:
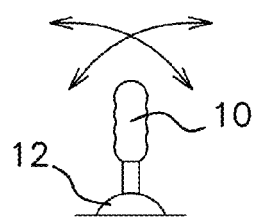

lock, and moving the vehicle in accordance with the movement instruction mode, with mode 2 corresponding to assisted parking mode and performing a semi-automatic parallel-parking maneuver.

13 Claims, 2 Drawing Sheets

(56) References Cited

U.S. PATENT DOCUMENTS

| | | | |
|---|---|---|---|
| 2002/0142701 A1* | 10/2002 | Rosenberg | G05D 1/005 446/454 |
| 2007/0024120 A1 | 2/2007 | Yoshida et al. | |
| 2008/0017436 A1 | 1/2008 | Dower | |
| 2008/0154464 A1* | 6/2008 | Sasajima | B62D 15/0285 701/42 |
| 2013/0006472 A1 | 1/2013 | McClain et al. | |

* cited by examiner $\beta_3 > \beta_M$ $\beta_4 > \beta_M$

SEMI-AUTOMATIC METHOD FOR ASSISTING WITH PARKING A MOTOR VEHICLE AND ASSOCIATED DEVICE

BACKGROUND OF THE INVENTION

Field of the Invention

The present invention relates to a method for assisting with parking a motor vehicle and an associated device.

The invention has highly advantageous applications, since it provides fast, intuitive assistance with parking, while avoiding the use of complicated and costly assistance equipment.

Description of the Related Art

Assistance with parking motor vehicles is becoming increasingly common at the present time. In a world where the urban proportion of the population is increasing, a considerable concentration of human activity is seen, and parking places for motor vehicles are hard to find in cities. In view of this situation, it is increasingly essential to assist drivers of motor vehicles in their parking maneuvers, since free parking places are harder to find and are becoming smaller in size in many cases.

The existing solutions for parking assistance are based on the relatively general-purpose equipment used for assisted steering means, with the aim of reducing the force to be applied to the steering components of vehicles during maneuvering, but above all, essentially, on the fitting of multiple sensors to motor vehicles. These sensors, such as on-board cameras and proximity sensors of the radar or lidar type, for example, can be used to provide the driver with information about the distances between their motor vehicles and potential obstacles. Evidently, this on-board equipment, together with the associated electronic information processing systems, represents an added cost that cannot be disregarded.

Although the effectiveness of this equipment is proven, and some types of equipment even enable parking to take place without any action by the driver, it is desirable to propose parking assistance which is more affordable in financial terms.

SUMMARY OF THE INVENTION

The aim of the invention is therefore to propose parking assistance which is effective, simple and inexpensive.

For this purpose, the invention proposes a semi-automatic method for assisting with parking a motor vehicle having steerable wheels, comprising the steps of:
  detecting the position of a movement control member maneuvered by a driver and capable of indicating a transverse component and a longitudinal component, relative to the motor vehicle, of a movement instruction, and
  analyzing the movement instruction generated by the movement control member.

The method is remarkable in that it further comprises the following steps:
  classifying the movement instruction in two modes:
    mode 1: movement instruction causing the motor vehicle to be put into motion according to the direction and bearing given by the movement instruction generated by the movement control member, for positions of the movement control member having an angle $\beta$ about the transverse axis and relative to its rest position which is smaller than the angle $\beta_M$ which sets the maximum steering angle $\alpha_M$ of the steerable wheels of the motor vehicle,
    mode 2: movement instruction causing the motor vehicle to be put into motion in the form of a sequence of alternating longitudinal movements associated with transverse turning of the steerable wheels, so as to perform "sawtooth" parking maneuvers, for positions of the movement control member having an angle $\beta$ about the transverse axis relative to its rest position which is greater than the angle $\beta_M$ which sets the maximum steering angle $\alpha_M$ of the steerable wheels of the motor vehicle,
  putting the motor vehicle into motion without any action by the driver other than on the movement control member, according to the movement instruction mode.

In specific embodiments, the invention may have one or more of the following characteristics, which may be considered individually or in any technically feasible combination:
  the method is active only for a low movement speed of the motor vehicle,
  when the motor vehicle is in the mode of being put into motion corresponding to mode 2, an accentuation of the longitudinal component by means of the movement control member is associated with an accentuation of the longitudinal movements in the direction and sense of the increased longitudinal component,
  any return of the movement control member to the rest position has the effect of stopping the motor vehicle from being put into motion,
  the method is self-adaptive to allow for the statistical dispersion of the movements of different drivers using the motor vehicle,
  the method uses haptic feedback at the movement control member, in order to give the driver a clear perception of the two types of movement instruction mode, this haptic feedback possibly taking the form of at least one friction point,
  the method generates audible and/or visual messages providing the driver with an indication of the current movement instruction mode.

The invention also includes a device for assisting with parking a motor vehicle having steerable wheels, the device being provided with means for:
  detecting the position of a movement control member maneuvered by a driver and capable of indicating a transverse component and a longitudinal component, relative to the motor vehicle, of a movement instruction, and
  analyzing the movement instruction generated by the movement control member.

Said device is remarkable in that it further comprises:
  means for classifying the movement instruction in two modes:
    mode 1: movement instruction causing the motor vehicle to be put into motion in the direction and sense given by the movement instruction generated by the movement control member, for positions of the movement control member having an angle $\beta$ about the transverse axis relative to its rest position which is smaller than the angle $\beta_M$ which sets the maximum steering angle $\alpha_M$ of the steerable wheels of the motor vehicle,
    mode 2: movement instruction causing the motor vehicle to be put into motion in the form of a sequence of alternating longitudinal movements associated with transverse turning of the steerable wheels, so as to perform "sawtooth" parking maneuvers, for positions of the movement control member having an angle β about the transverse axis relative to its rest position which is greater than the angle $β_M$ which sets the maximum steering angle $α_M$ of the steerable wheels of the motor vehicle, means for putting the motor vehicle into motion without any action by the driver other than on the movement control member, according to the movement instruction mode.

According to one embodiment of the device, the movement control member maneuvered by the driver is a lever of the joystick type.

Finally, the invention includes a computer-readable recording medium on which is recorded a computer program comprising program code instructions for executing the steps of the method described above.

BRIEF DESCRIPTION OF THE DRAWING FIGURES

Figure 2:
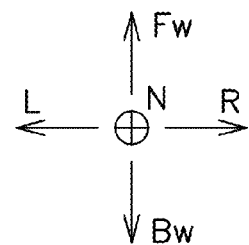
Figure 3:
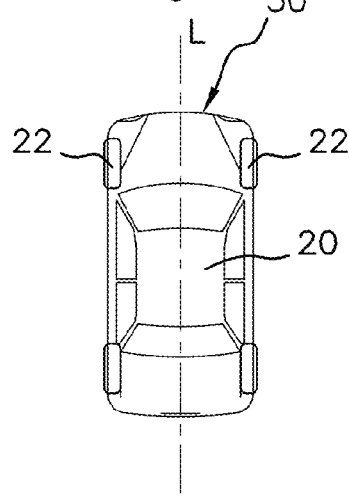
Figure 4A:
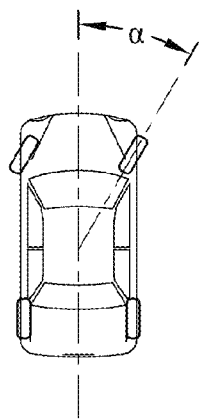
Figure 4B:
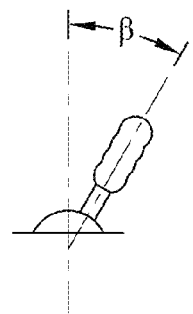
Figure 5A:
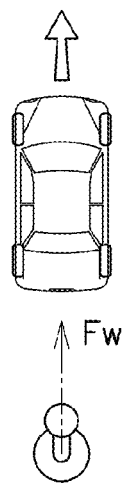
Figure 5B:
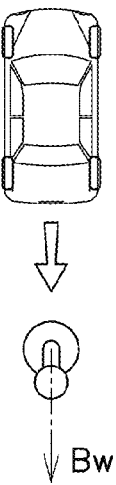
Figure 5C:
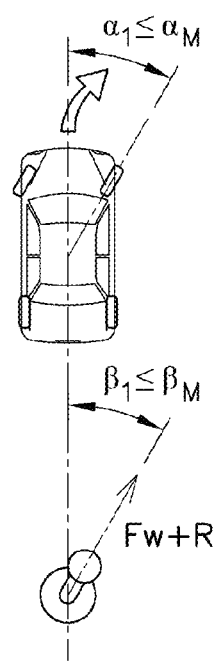
Figure 5D:
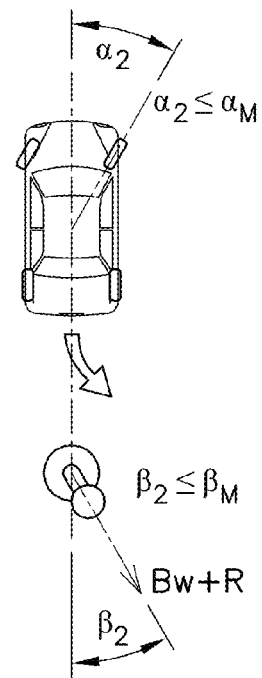
Figure 6A:
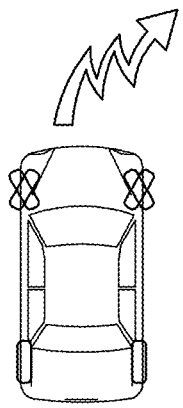
Figure 6A:
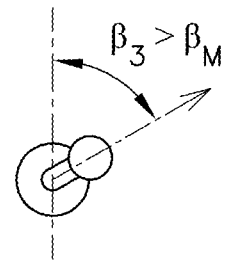
Figure 6B:
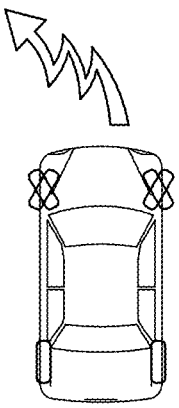
Figure 6B:
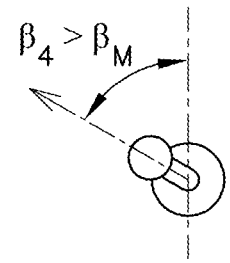
Figure 7:
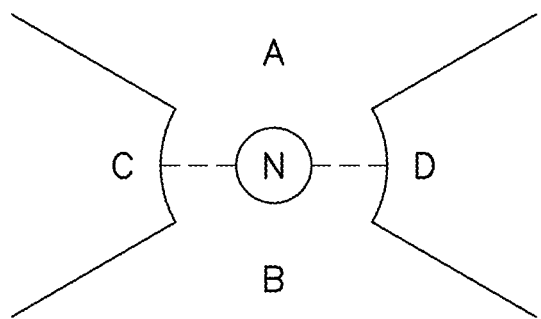

The invention will be more readily understood from a reading of the following description. This description is purely illustrative and is to be read with reference to the attached drawings, in which:

FIG. 1 shows a schematic representation of a movement control member according to the invention, FIG. 2 is a top view of FIG. 1, showing the different movement control axes of the movement control member, FIG. 3 shows a schematic representation of a motor vehicle in a top view, FIGS. 4a and 4b show schematically the steering angle α of a motor vehicle, associated with the angle β of the movement control member about the transverse axis, FIGS. 5a to 5d show schematically the association between positions of the movement control member and the resulting movements of the motor vehicle, for control instructions belonging to mode 1, FIGS. 6a to 6b show schematically the association between positions of the movement control member and the resulting movements of the motor vehicle, for control instructions belonging to mode 2, FIG. 7 shows, in a top view of FIG. 1, an example of the different movement areas of the movement control member according to the invention.

DETAILED DESCRIPTION OF THE INVENTION

In the description, the same reference numerals are used from one figure to the next to indicate identical or functionally similar parts.

In the description, actions are assigned to devices or programs. This means that these actions are executed by a microprocessor of this device or of the device including the program, said microprocessor then being controlled by instruction codes recorded in a memory of the device. These instruction codes enable the resources of the device to be used, and therefore permit the execution of the action undertaken.

FIG. 1 shows a movement control member 10 used to execute the method according to the invention. In this case, the control member is a device similar to a games control lever (or "joystick" in English), but any other equivalent means may be used without departure from the scope of the invention.

This movement control member 10 can be manipulated by the driver of the motor vehicle 20 and can assume different positions relative to its base 12. When a movement control member 10 of this type is placed in a motor vehicle (not shown in FIG. 1) to which the invention is applied, it is located on the armrest of the driver's door for example, or alternatively on the center console. It can be expressly dedicated to the parking assistance application, or can have other combined and/or alternative functions, such as the adjustment of the external rear-view mirrors of the motor vehicle 20, or even the main directional control of said motor vehicle 20.

The movement control member 10 is connected, by means which are not detailed herein and are not the subject of the present invention, to a device for controlling the turning of the steerable wheels 22 of the motor vehicle 20 (see FIG. 3), and to a device for controlling the putting of said motor vehicle 20 into motion. The motor vehicle may advantageously be provided with power-assisted steering for turning the steerable wheels 22, and with an electric propulsion motor for putting the motor vehicle 20 into motion. Alternatively, any equivalent means may be used without thereby departing from the scope of the present invention. For example, the electric motor may be replaced by an internal combustion engine, the gearbox may be of the automatic or robotic type, the motor vehicle may have four steerable wheels, and so on.

The movement control member 10 may be moved along two main axes of movement relative to its base 12. FIG. 2 shows in a top view the possible movements of said movement control member 10 and the two main axes. The movements of the movement control member 10 are detected by means of position sensors which are known to those skilled in the art and will not be detailed below.

Starting from what is known as a "rest" position N, the movement control member 10 can be moved longitudinally relative to the motor vehicle from forwards (Fw) to backwards (Bw). Depending on the position assumed by the movement control member 10 along the longitudinal axis defined in this way, the motor vehicle 20 is put into forward or reverse movement, without any other action by the driver (no pressure is required on the accelerator or brake pedal, for example).

Starting from the rest position N, the movement control member 10 can be moved transversely relative to the motor vehicle from left (L) to right (R). Depending on the position assumed by the movement control member 10 along the transverse axis defined in this way, the steerable wheels 22 of the motor vehicle 20 are made to steer to the right or left, without any other action by the driver.

Clearly, any combination of these two types of movement of the movement control member is possible.

We shall now explain the steering control mode and the mode of putting the motor vehicle 20 into motion on the basis of the commands received via the movement control member 10.

When the movement control member 10 is not subjected to any movement force, it remains in its rest position N, and the steerable wheels 22, here located at the front 30 of the motor vehicle 20 (see FIG. 3), are aligned with the longitudinal axis L of said motor vehicle 20, and the motor vehicle is not put into motion.

If a force is exerted on the movement control member 10, it is then inclined transversely at an angle β toward the driver's right (see FIG. 4b), the steerable wheels 22 are turned to the right at an associated angle α (see FIG. 4a). The mathematical law relating the values of the angles α and β may be of various kinds, and may or may not be linear.

One particular angle $β_M$ is the angle corresponding to the maximum steering angle $α_M$ of the steerable wheels 22. In a prior art control device, any angle β greater than $β_M$ causes the steerable wheels to be turned to the maximum extent at the angle $α_M$. The way in which the invention differs from this prior art is detailed below.

We shall now detail, with the aid of FIGS. 5a to 5d, some examples of commands for movement instructions of mode 1, that is to say with $β≤β_M$ (and therefore $α≤α_M$). In fact, α and β are zero in FIGS. 5a and 5b, $β_1≤β_M$ (and therefore $α_1≤α_M$) in FIG. 5c, and $β_2≤β_M$ (and therefore $α_2≤α_M$) in FIG. 5d.

If a force is exerted on the movement control member 10 and it is then inclined longitudinally forwards (arrow Fw) as seen by the driver (see FIG. 5a), the steerable wheels 22 remain aligned with the longitudinal axis L of the motor vehicle 20, since no transverse component of the movement control member 10 has been detected, and the motor vehicle 20 is put into motion in the forward direction, in a straight line.

If a force is exerted on the movement control member 10 and it is then inclined longitudinally backwards (arrow Bw) as seen by the driver (see FIG. 5b), the steerable wheels 22 remain aligned with the longitudinal axis L of the motor vehicle 20, since no transverse component of the movement control member 10 has been detected, and the motor vehicle 20 is put into motion in the backward direction, in a straight line.

The movement speed in the movement instruction mode of mode 1 is related to the position of the movement control member 10 along the longitudinal axis. The farther it is moved from its rest position N, the higher is the vehicle speed, regardless of whether the movement is forward (Fw) or backward (Bw).

FIGS. 5c and 5d show two examples of a situation in which the movement control member 10 is placed in a position having a longitudinal component and a transverse component. FIG. 5c shows a forward longitudinal component Fw and a transverse component toward the right R. Consequently the motor vehicle 20 will advance while turning right. FIG. 5d shows a backward longitudinal component Bw and a transverse component toward the right R. Consequently the motor vehicle 20 will reverse while turning right. Other cases are possible, with a transverse component oriented toward the left L.

This steering control mode and the mode of putting the motor vehicle 20 into motion on the basis of the commands received via the movement control member 10 is known in itself and can be used for controlling a vehicle.

The invention proposes greater parking assistance than that provided by this operating principle. For this purpose, a method for applying the invention comprises the following steps:

- detecting the position of a movement control member 10 maneuvered by a driver and capable of indicating a transverse component and a longitudinal component, relative to the motor vehicle 20, of a movement instruction,
- analyzing the movement instruction generated by the movement control member. The method then proposes to classify the movement instruction in two modes:
  - mode 1: movement instruction causing the motor vehicle 20 to be put into motion in the direction and sense given by the movement instruction generated by the movement control member 10, for positions of the movement control member 10 having an angle β about the transverse axis relative to its rest position N which is smaller than the angle $β_M$ which sets the maximum steering angle $α_M$ of the steerable wheels 22 of the motor vehicle 20. This mode 1, described above, is represented in FIG. 7 by areas A and B of the positioning of the movement control member 10.
  - mode 2: movement instruction causing the motor vehicle 20 to be put into motion in the form of a sequence of alternating longitudinal movements associated with transverse turning of the steerable wheels, so as to perform "sawtooth" parking maneuvers, for positions of the movement control member 10 having an angle β about the transverse axis relative to its rest position N which is greater than the angle $β_M$ which sets the maximum steering angle $α_M$ of the steerable wheels 22 of the motor vehicle 20. This mode 2 is represented in FIG. 7 by areas C and D of the positioning of the movement control member 10.
- As a result of this classification, the motor vehicle is put into motion in an associated way, without any action by the driver other than on the movement control member.

Thus movement instruction mode 1 causes the vehicle to be put into motion in a way comparable to those described in FIGS. 5a to 5d, for example. This way of putting a vehicle into motion is known from the prior art and is used for controlling the movement of motor vehicles in general, when they are equipped with a movement control member of the "joystick" type.

The present invention differs from the prior art in that it combines the movement mode associated with a mode 1 movement instruction with a second movement mode associated with a mode 2 movement instruction, these two movement modes being integrated into a single device. For its part, movement instruction mode 2 causes the vehicle to be put into motion in the way illustrated in FIGS. 6a to 6b, and will be described below.

When the angle β of the movement control member 10 about the transverse axis relative to its rest position N is greater than the angle $β_M$ which sets the maximum steering angle $α_M$ of the steerable wheels 22 of the motor vehicle 20, the motor vehicle performs a maneuver of the "sawtooth" type in place of the driver, who no longer has to personally perform the sequences of steering and counter-steering associated with the alternating forward and backward movements that make up said sawtooth maneuvers. Parking then becomes very easy, with the driver simply supervising the maneuver without having to perform any physical action other than the manipulation of the movement control member 10.

In this sense, the method for parking assistance according to the invention can be described as "semi-automatic". This is because, although it greatly simplifies the maneuvers, it still requires the presence and attention of the driver throughout the maneuver, for the purpose of observing and assessing the limitations of the available space and for avoiding obstacles (vehicles parked nearby, sidewalks, careless pedestrians, and so forth).

In movement instruction mode 2, the longitudinal component, regardless of whether it is oriented forwards Fw or backwards Bw, is interpreted by the computer executing the method according to the invention as an indication of the direction of the initial movement of the "sawtooth". Thus, a forward longitudinal component Fw will be interpreted as a command for starting a sawtooth maneuver, beginning with a forward movement. Similarly, a backward longitudinal component Bw will be interpreted as a command for starting a sawtooth maneuver, beginning with a reverse movement. By accentuating the longitudinal component during the maneuver, the driver can thus accentuate the longitudinal movements of the motor vehicle 20 in the direction of this component. Finally, for practical reasons, a zero longitudinal component in mode 2 can be associated with a default initial movement, for example a backward movement.

If the driver releases the movement control member 10, the latter automatically returns to its rest position N, and the motor vehicle 20 is immobilized. The driver is thus fully in control of his motor vehicle 20, and can therefore stop the parking assistance procedure at any moment.

Advantageously, this changeover from parking assistance mode (mode 2) is activated only at low speeds of the motor vehicle 20, for example for a movement speed of the motor vehicle 20 below or equal to 30 km/h. This has the advantage of avoiding the risk of switching over to parking assistance mode at high speed, which would have very dangerous consequences for the motor vehicle 20, its occupants and other road users.

Similarly, the maneuvers activated by the changeover to parking assistance mode are only performed at low speed, so that the driver is allowed sufficient reaction time for his supervision of the parking assistance procedure.

In one embodiment, the method uses haptic feedback at the movement control member 10, in order to give the driver a clear perception of the two types of movement instruction mode. The joystick may, for example, have a friction point when the driver moves from area A to D, or from A to C, or from B to D, or from B to C (see FIG. 7). The reader is reminded that areas C and D correspond to the positions of the movement control member 10 setting mode 2, whereas areas A and B correspond to positions of the movement control member 10 setting mode 1. Areas A, B, C and D may vary in size for reasons of ease of use, for example. It may be desirable to reduce areas C and D, for example, to allow more room for maneuver in the control operations associated with areas A and B.

The message transmitted by haptic feedback may also be supplemented or replaced by audible and/or visual messages providing the driver with an indication of the current movement instruction mode.

In one embodiment of the invention, the method according to the invention may be supplemented with active intelligence, in order to make it self-adaptive to allow for the statistical dispersion of the movements of different drivers using the motor vehicle 20.

Advantageously, the invention may be improved in that, during backward movements Bw in mode 1, allowance is made for the natural and personal tendencies of the driver. This is because some drivers, when moving backwards in a motor vehicle 20, tend to turn the wheel to the right to reverse to the right, while others tend to turn it to the left (this is even more likely if the driver turns himself round to perform the maneuver). This gives rise to considerable difficulty for some drivers when learning to perform backward movements. In this case the control of the movement control member 10 can be configured so that inversion is possible, if the driver so chooses, thus simplifying the backward movements in mode 1.

The invention also relates to the device for assistance with parking associated with the method described above.

Finally, the invention also relates to any type of computer-readable recording medium on which is recorded a computer program comprising program code instructions for executing the steps of the method according to the invention.

In the claims, the term "comprise" does not exclude other elements or other steps. The indefinite article "a" or "an" does not exclude a plural. The various characteristics described and/or claimed may advantageously be combined. Their presence in the description or in various dependent claims does not exclude this possibility. The reference symbols are not to be interpreted as limiting the scope of the invention.

The invention is not limited to the embodiment described, and any modification that a person skilled in the art may make is possible without departure from the invention. For example, the changeover from mode 1 to mode 2 has been described as taking place on the basis of the angle $\beta$ when it becomes greater than an angle $\beta_M$. A possible alternative is to compare the transverse and longitudinal components of the position of the movement control member 10 and to change over to parking assistance mode when the transverse component is greater than the longitudinal component. Similarly, the method is adapted for "sawtooth" maneuvers for entering or leaving a parking place, but its use is not expressly limited to this type of maneuver.

REFERENCES 10 movement control member,
12 base of the movement control member,
20 motor vehicle,
22 steerable wheel,
30 front of the motor vehicle,
Bw rear end of the longitudinal component,
Fw front end of the longitudinal component,
L left-hand end of the transverse component,
N rest position of the movement control member,
R right-hand end of the transverse component,
$\alpha, \alpha_1, \alpha_2$ steering angles of the steerable wheels,
$\alpha_M$, maximum steering angle of the steerable wheels,
$\beta, \beta_1, \beta_2, \beta_3, \beta_4$ angle of inclination of the movement control member,
$\beta_M$ angle of inclination of the movement control member corresponding to the maximum steering angle of the steerable wheels

The invention claimed is:

1. A semi-automatic method for assisting with parking a motor vehicle having steerable wheels, comprising the steps of:
   detecting a position of a movement control member maneuvered by a driver and capable of indicating a transverse component and a longitudinal component, relative to the motor vehicle, of a movement instruction,
   analyzing a movement instruction generated by the movement control member,
   classifying the movement instruction in two modes:
      mode 1: movement instruction causing the motor vehicle to be put into motion in a direction and sense given by the movement instruction generated by the movement control member, for positions of the movement control member having an angle $\beta$ in a transverse direction relative to a rest position of the movement control member which is smaller than an angle $\beta_M$ which sets a maximum steering angle $\alpha_M$ of the steerable wheels of the motor vehicle,
      mode 2: movement instruction causing the motor vehicle to be put into motion in a form of a sequence of alternating longitudinal movements associated with any transverse turning of the steerable wheels, so as to perform "sawtooth" parking maneuvers, for positions of the movement control member having the angle β in the transverse direction relative to the rest position which is greater than the angle $β_M$ which sets the maximum steering angle $α_M$ of the steerable wheels of the motor vehicle, and putting the motor vehicle into motion without any action by the driver other than on the movement control member, according to the movement instruction mode.

2. The method as claimed in claim 1, wherein the method is active only for a low movement speed of the motor vehicle.

3. The method as claimed in claim 1, wherein, when the motor vehicle is put into motion in the mode corresponding to mode 2, an accentuation of the longitudinal component by means of the movement control member is associated with an accentuation of the longitudinal movements in the direction and sense of an increased longitudinal component.

4. The method as claimed in claim 1, wherein any return of the movement control member to the rest position has the effect of stopping the motor vehicle from being put into motion, and the motor vehicle is stopped.

5. The method as claimed in claim 1, wherein the method accommodated a variety of the movements requested by different drivers using the motor vehicle.

6. The method as claimed in claim 1, wherein a controller executing the method uses haptic feedback at the movement control member, in order to give the driver a clear perception of the two movement instruction modes.

7. The method as claimed in claim 6, wherein a controller using the method uses at least one friction point at the movement control member.

8. The method as claimed in claim 1, wherein a controller using the method generates audible and/or visual messages providing the driver with an indication of the current movement instruction mode.

9. A computer-readable recording medium embodied in a non-transitory storage medium on which is recorded a computer program comprising program code instructions for executing the steps of the method as claimed in claim 1.

10. A device for assisting with parking a motor vehicle having steerable wheels, provided with means for:
    detecting a position of a movement control member maneuvered by a driver and capable of indicating a transverse component and a longitudinal component, relative to the motor vehicle, of a movement instruction, and
    analyzing a movement instruction generated by the movement control member,
    means for classifying the movement instruction in two modes:
        mode 1: movement instruction causing the motor vehicle to be put into motion in a direction and sense given by the movement instruction generated by the movement control member, for positions of the movement control member having an angle β in a transverse direction relative to a rest position of the movement control method which is smaller than an angle $β_M$ which sets a maximum steering angle $α_M$ of the steerable wheels of the motor vehicle,
        mode 2: movement instruction causing the motor vehicle to be put into motion in a form of a sequence of alternating longitudinal movements associated with any transverse turning of the steerable wheels, so as to perform "sawtooth" parking maneuvers, for positions of the movement control member having an angle β in the transverse direction relative to its rest position which is greater than the angle $β_M$ which sets the maximum steering angle $α_M$ of the steerable wheels of the motor vehicle, and
    means for putting the motor vehicle into motion without any action by the driver other than on the movement control member, according to the movement instruction mode.

11. The device as claimed in claim 10, wherein the movement control member maneuvered by the driver is a joystick.

12. A device for assisting with parking a motor vehicle having steerable wheels, comprising:
    a detector configured to detect a position of a movement control member maneuvered by a driver and capable of indicating a transverse component and a longitudinal component, relative to the motor vehicle, of a movement instruction, and
    a computer configured for:
    analyzing a movement instruction generated by the movement control member,
    means for classifying the movement instruction in two modes:
        mode 1: movement instruction causing the motor vehicle to be put into motion in a direction and sense given by the movement instruction generated by the movement control member, for positions of the movement control member having an angle β in a transverse direction relative to a rest position of the movement control method which is smaller than an angle $β_M$ which sets a maximum steering angle $α_M$ of the steerable wheels of the motor vehicle,
        mode 2: movement instruction causing the motor vehicle to be put into motion in a form of a sequence of alternating longitudinal movements associated with any transverse turning of the steerable wheels, so as to perform "sawtooth" parking maneuvers, for positions of the movement control member having an angle β in the transverse direction relative to its rest position which is greater than the angle $β_M$ which sets the maximum steering angle $α_M$ of the steerable wheels of the motor vehicle, and
    a device configured for putting the motor vehicle into motion without any action by the driver other than on the movement control member, according to the movement instruction mode.

13. The device as claimed in claim 12, wherein the movement control member maneuvered by the driver is a joystick.

* * * * *